United States Patent
Elings

Patent Number: 5,553,487
Date of Patent: Sep. 10, 1996

[54] METHODS OF OPERATING ATOMIC FORCE MICROSCOPES TO MEASURE FRICTION

[75] Inventor: Virgil B. Elings, Santa Barbara, Calif.

[73] Assignee: Digital Instruments, Inc., Santa Barbara, Calif.

[21] Appl. No.: 502,368

[22] Filed: Jul. 14, 1995

Related U.S. Application Data

[60] Continuation of Ser. No. 301,588, Sep. 7, 1994, abandoned, which is a division of Ser. No. 974,603, Nov. 12, 1992, Pat. No. 5,400,647.

[51] Int. Cl.⁶ .......................... G01B 11/30; G01N 19/02
[52] U.S. Cl. .................................... 73/105; 73/9
[58] Field of Search .................. 73/9, 105, 862.639, 73/862.624, 862.634, 862.324; 250/306, 307

[56] References Cited

U.S. PATENT DOCUMENTS

| | | | |
|---|---|---|---|
| Re. 33,387 | 10/1990 | Binnig | 250/306 |
| 4,081,989 | 4/1978 | Majcherczyk | 73/9 |
| 4,935,634 | 6/1990 | Hansma et al. | 250/306 X |
| 5,025,658 | 6/1991 | Elings et al. | 73/105 |
| 5,051,646 | 9/1991 | Elings et al. | 250/307 X |
| 5,077,473 | 12/1991 | Elings et al. | 250/306 |
| 5,193,383 | 3/1993 | Burnham et al. | 73/105 |
| 5,198,667 | 3/1993 | Glembocki et al. | 250/306 |
| 5,347,854 | 9/1994 | Martin et al. | 73/105 |
| 5,363,697 | 11/1994 | Nakagawa | 73/105 |
| 5,412,980 | 5/1995 | Elings et al. | 73/105 |
| 5,415,027 | 5/1995 | Elings et al. | 73/105 |

*Primary Examiner*—Thomas P. Noland
*Attorney, Agent, or Firm*—Oblon, Spivak, McClelland, Maier & Neustadt, P.C.

[57] ABSTRACT

A method of operating an atomic force microscope having a probe tip attached to a free end of a lever which is fixed at its other, wherein the probe tip is scanned in forward and reverse directions in a common scanline across the surface of a sample and either the deflection of the lever or the height of the sample is detected during the forward and reverse scans. The difference between the deflection of the lever or the sample height in the forward and reverse scans is determined as a relative measure of friction. A signal relating to the normal force applied to the sample, can be determined and based thereon, a coefficient of friction of the sample is determined. The signal relating to normal force is derived either from a force curve, or by scanning the probe at different force setpoints. To enhance accuracy of topographical data, the scanning angle is varied in order to minimize differences between the probe deflection (or sample height) during scanning in the forward and reverse directions. Once it is determined which angle results in minimum difference in data obtained during scanning in the forward and reverse directions in a common scanline, topographical data is obtained by scanning the sample at that angle. Frictional data is obtained by scanning at that angle which maximizes the difference between data obtained in forward and reverse scanning directions in a common scanline.

5 Claims, 7 Drawing Sheets

$$F_n = \sum F_i = F_c + F_e + F_{st} + F_{vw} + F_m$$

METHODS OF OPERATING ATOMIC FORCE MICROSCOPES TO MEASURE FRICTION

This application is a division of application Ser. No. 08/301,588, filed on Sep. 7, 1994, now abandoned, which is a divisional of application Ser. No. 07/974,603, filed on Nov. 12, 1992, now U.S. Pat. No. 5,400,647, issued Mar. 28, 1995.

BACKGROUND OF THE INVENTION

1. Field of the Invention

The present invention relates to a method of operating an Atomic Force Microscope (AFM) having a probe tip attached to the free end of a lever which is fixed at the other end, and having a means to detect deflection or bending of the lever, a scanning means to scan the probe tip with respect to a sample, the detecting means being used to detect deflection or bending of the probe tip as it is scanned over the sample due to the topography, and more particularly to a method to detect the displacement of the lever due to lateral forces, which method uses the same vertical deflection detector as used for topography and produces a measure of the frictional properties of the sample surface.

2. Discussion of the Background

Atomic Force Microscopes are devices that provide three dimensional topographic images of surfaces. These devices are capable of providing resolution to atomic dimensions of surface features. In an Atomic Force Microscope (AFM), an extremely sharp tip is mounted on a small flexible lever. The tip is positioned on a surface such that the attractive forces between the surface and the tip and the repulsive force of the surface on the tip are very close to equilibrium so that the force of the tip on the surface is extremely low. If the tip is scanned laterally across a sample, the deflection of the tip will vary with the surface structure and this modulation versus lateral scan position can be used to produce an image of the surface. More typically, the sample may be servoed up and down such that the tip deflection (and thus the tip force) is kept constant during lateral scanning and the vertical adjustment signal versus lateral scan position produces a topographic map of the surface. A microscope of this type is described in U.S. Pat. No. 4,935,634, by Hansma et al. The deflection of the tip can be sensed in various ways, such as using the tunneling effect off the backside of the tip as described in a patent by Binnig, optical means such as beam deflection as described in Hansma, or interferometry. Typically, most AFMs mount the tip on a low spring-constant cantilever and sense deflection by monitoring the change in angle of reflected light off the backside of the cantilever. AFMs can operate directly on insulators as well as conductors and, therefore, can be used on materials not directly accessible to other ultra-high resolution devices such as Scanning Electron Microscopes (SEMs) or Scanning Tuenneling Microscopes (STMs).

The tip in an AFM must be positioned with extreme accuracy in three dimensions relative to a sample. Motion perpendicular to the sample (z-axis) provides surface profile data. Motion parallel to the surface generates the scanning. In a typical system, the image is developed from a raster type scan, with a series of data points collected by scanning the tip along a line (x-axis), and displacing the tip perpendicularly in the image plane (y-axis); and, repeating the step and scan process until the image is complete. The precise positioning in x, y, and z is usually accomplished with a piezoelectric device. Piezoelectric devices can be made to expand or contract by applying voltages to electrodes that are placed on the piezoelectric material. The motions produced by these piezoelectric scanners can be extremely small, with some scanners having sensitivities as low as tens of angstroms per volt. The total deflection possible for these scanners is typically less than 200 microns. Scanners with different sensitivities are used for different applications, with low sensitivities used for atomic resolution images, and higher sensitivity scanners used for lower resolution, larger area images. The design of the piezoelectric scanners, including the shape of the scanner and the placement of electrodes, is well known in the art.

In an AFM, either the sample can be attached to the scanner and the tip held stationary or the tip can be attached to the scanner and the sample fixed. Typically, most existing AFMs scan the sample. This invention will describe, and the drawings will represent the case where the sample is scanned; but, the invention applies equally well to either case.

As the sample is scanned in x and y, the z axis movement is closely coupled to the tip deflection. In an AFM, either the tip deflection can be monitored as the sample is scanned or the z position can be varied to maintain the deflection constant with feedback. This constant deflection is called the setpoint and can be set by the control system. Modulating the z position with feedback is useful for controlling and minimizing the contact force between tip and sample, and also allows the AFM to be used for other measurements, such as stiffness.

Figure 1:
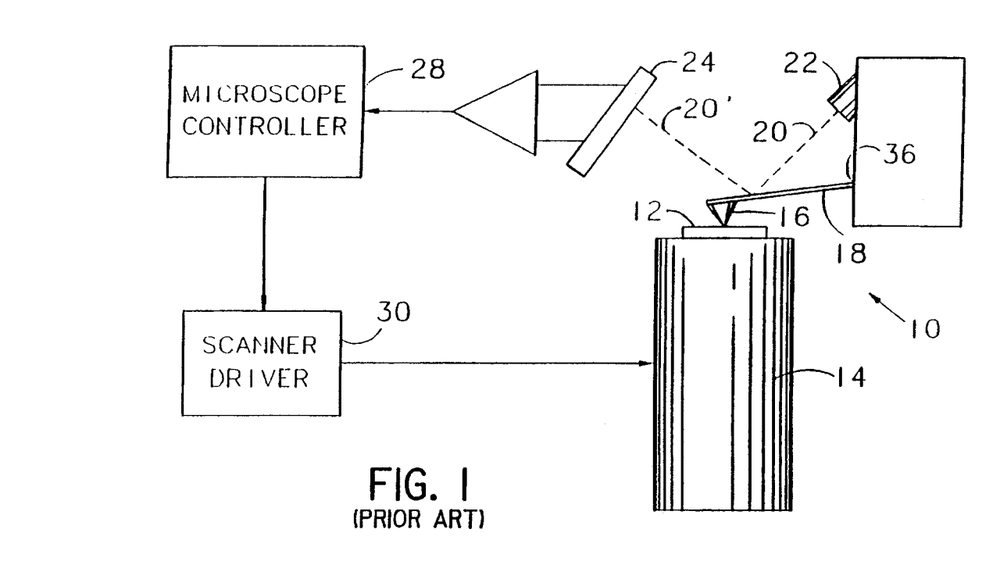
FIG. 1 is a block diagram of a prior art AFM.
Figure 2:
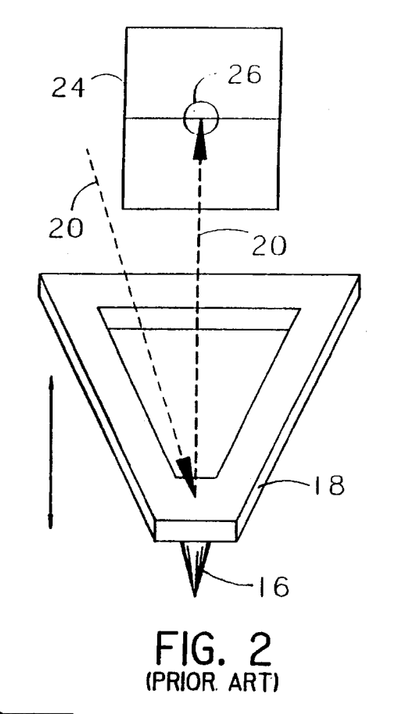
FIG. 2 is an illustration of the operation of a two-quadrant detector.

A prior art AFM 10 is illustrated in FIG. 1, this figure being representative of the prior art AFM made by Digital Instruments, Inc., the assignee of this invention, and sold under the trademark NanoScope. The sample 12 is attached to a three-axis piezoelectric scanner 14. The sample 12 is brought into close proximity to a sharp tip 16 that is attached or part of a small, stiff cantilever 18. Some means of detecting the deflection of the cantilever is required. An optical means is illustrated, where light 20 from a small laser 22 is focused onto a reflective area on the back of the cantilever 3, and the reflected light 22' is detected by a split photodetector 24. The difference between outputs of the two elements of the split photodetector 24 is determined, which very accurately determines the location of a spot of the reflected light 22' vertically on the photodetector 24, which is determined by the angle of the cantilever 18. As shown in FIG. 2, the laser is aligned to have the spot 26 initially centered on the dividing line between two elements of the photodetector 24 such that the difference signal is highly sensitive to bending of the cantilever 18. This is a one-dimensional detector, sensitive only to bending of the cantilever 18. The difference signal is used by the controller 28 to create the image, provide feedback to the scanner driver 30 for scanner control and other functions well known in the art. Spring constants on the order of one newton/meter and lengths of 100 microns are typical parameters for the cantilever 18. When operated in a constant deflection mode using feedback, very small forces can be applied to the sample 12.

AFMs usually are operated under control of a computer which, in some cases, controls the scanning and feedback directly; and, in most cases, acquires and displays the data. Therefore, most modern AFMs have the capability to vary scan sizes and rates, select feedback modes, and display and process entire images or individual scanlines, usually with interaction from the operator through a mouse or keyboard. Certain scan control, data display and reduction capabilities, and user interaction features are considered conventional in this application and, accordingly, are not described in detail.

Figure 3:
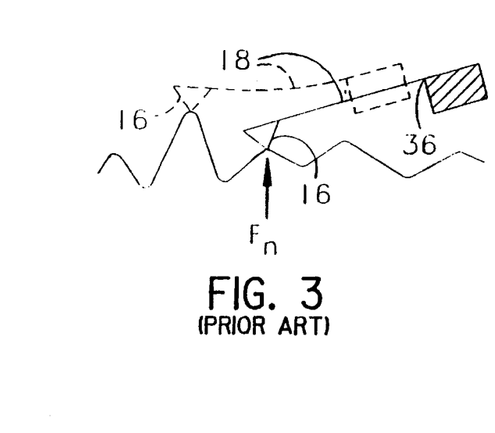
FIG. 3 shows the response of the cantilever to a normal force (topography).
Figure 4:
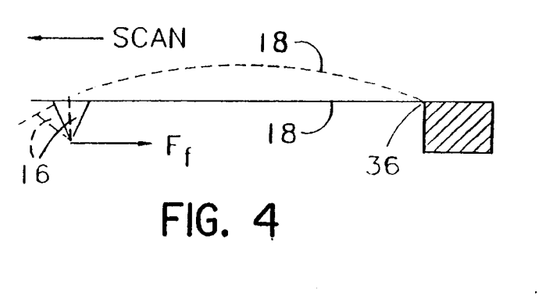
FIG. 4 shows the response of the cantilever to a lateral force (friction).

The AFM described above is suitable for characterizing a surface as to properties that are functions of z for a given x, y position, such as topography and stiffness, because the deflection of the cantilever 18 due to the normal force is the measured quantity, as depicted in FIG. 3. There are, however, parameters of interest that could be measured by looking at the deflection or deformation of the cantilever due to lateral or frictional forces as depicted in FIG. 4. A useful parameter to measure at very high resolution is the surface friction. Although bulk friction can be measured, many applications, such as data storage technologies for example, use lubricants that are applied in very thin layers which can be partially worn away, and the local friction is, therefore, of interest.

Specialized local friction measuring devices using AFM techniques have been constructed by Kaneko at NTT ("A Frictional Force Microscope Controlled with an Electromagnet," Journal of Microscopy, Vol. 152, Pt. 2, 11–88) and also by Mate and McLellan at IBM ("Atomic Scale Friction of a Tungsten Tip on a Graphite Surface," Phys Rev Lett, 59, p.1942, 1987). In the IBM device, measurements were made that showed the friction due to individual graphite atoms. In both of these devices, the lateral deflection of the probe was monitored while the vertical deflection force was not precisely controlled. To measure the friction difference between a lubricated compared to an unlubricated surface, it would be more useful to measure both with a constant vertical force. Moreover, a measure of surface friction would be more meaningful if the topography data were available from the area where the friction was measured. In addition, maintaining vertical AFM capability in a friction-measuring device would allow for precise adjustment and control of the vertical force. Thus, although the above-referenced prior art has shown that it is possible to measure local friction down to atomic resolution, this capability was only demonstrated in special purpose systems without full vertical AFM capability and, in fact, was based on force-sensing devices which would be unsuitable for low force vertical AFM operation.

Figures 5, 6, 7A, 7B:
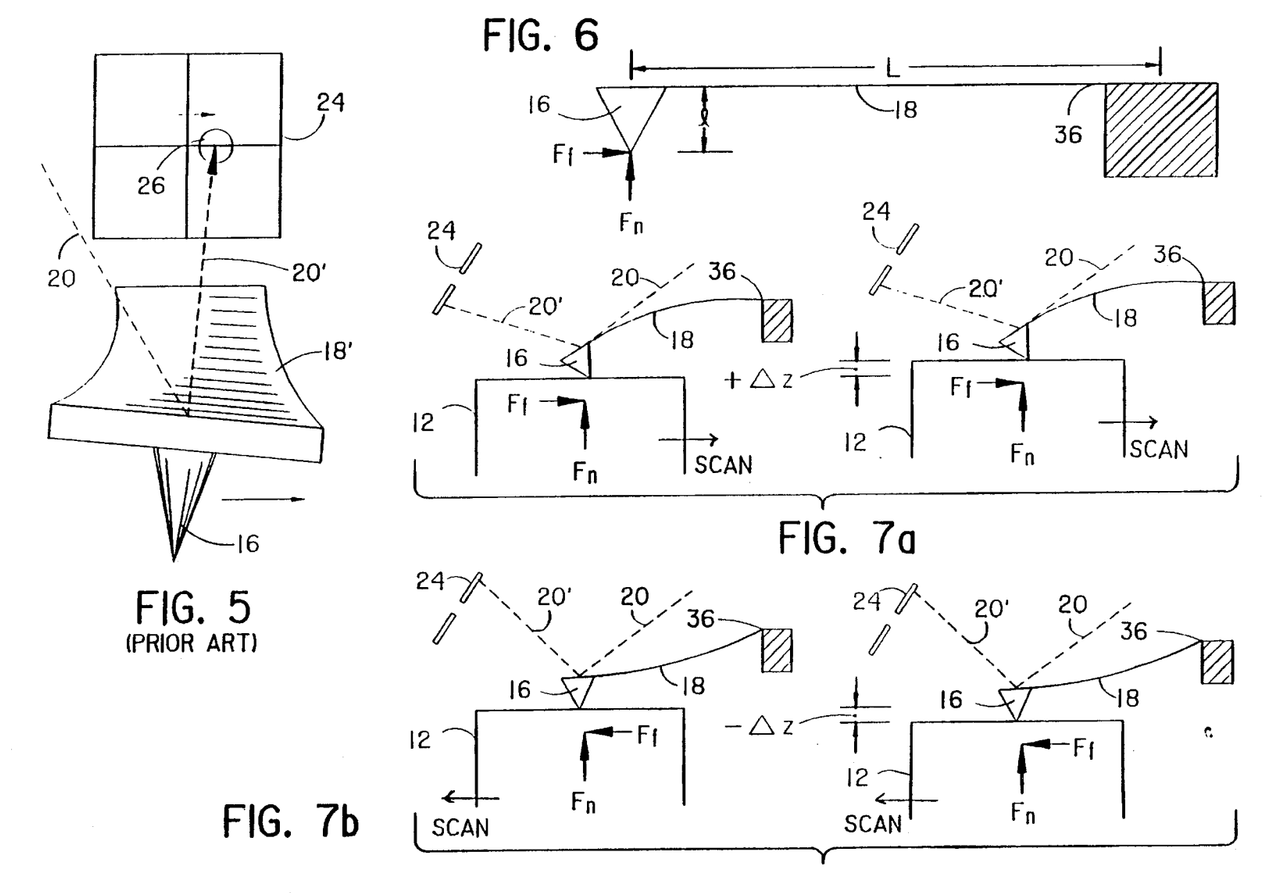
FIG. 5 is an illustration of the operation of a four-quadrant detector.
FIG. 6 shows how the normal and frictional forces are exerted on the cantilever.
FIGS. 7a and 7b show how the feedback will react to counter the effect of the frictional force on scans of opposite direction.

The AFMs described so far operate with a detection scheme that is one dimensional, either vertical or lateral. Most existing commercial AFMs just have a vertical deflection detector. One approach to achieving the dual capability of making lateral and vertical deflection measurements is to use a two-dimensional split photodetector, such as a four-quadrant split photodetector or a two-axis position-sensitive split photodetector 24', as illustrated in FIG. 5. Such devices are commonly available. With appropriate electronics, which are conventional, the difference can be taken between the right and left half of the photodetector in addition to the difference between the upper and lower half. Often, as depicted in FIG. 5, a rectangular cantilever 18' is used, which will deflect vertically in response to topography; but, will also easily twist or bend to deflect laterally in response to lateral forces as the tip 16 is scanned. More common triangular shape cantilevers may also be used, as well as more unusual shapes designed specifically to maximize lateral response while maintaining good vertical response and stability. Both motions can be detected using the four-quadrant split photodetector 24', such that the vertical deflection feedback can be maintained as the lateral deflections are measured. Such a scheme allows for equal resolution in measuring lateral deflections while maintaining the performance in measuring vertical deflections that is achieved in the prior art AFM. Several researchers have experimented with this arrangement; and, one approach using a two-axis position-sensitive detector (PSD) is described by Meyer and Amer of IBM in "Simultaneous Measurement of Lateral and Normal Forces With an Optical Beam Deflection Atomic Force Microscope" in Applied Physics Letters, 57, p. 2089–2091, Nov. 12, 1980. The inventor herein has also constructed and sold an AFM of this type using a four-quadrant detector, which also measures lateral forces.

Thus, it has been shown that devices may be developed based on AFM technology that have comparable lateral force resolution to conventional AFM topographic resolution. AFMs which incorporate two-dimensional detection systems have been developed commercially. It would be desirable if possible, however, to add some type of lateral force measuring capability to existing AFMs which have one-dimensional deflection detectors. The two-dimensional detection techniques require modification of the microscope itself to incorporate additional electronics and signals, which is inconvenient for users who have already made the investment in an existing microscope; but, who wish to add friction-measuring capability.

Although the light beam deflection technique can measure light deflections in two dimensions to measure both vertical and lateral deflections, other detectors are not sensitive in two dimensions and can only measure vertical deflection. For instance, the compact AFM described in U.S. Pat. No. 5,025,658 by Elings et al, has an interferometric detector which measures cantilever height. If the light beam is placed about halfway from the fixed end to the tip end of the cantilever, then the bow of the cantilever caused by the frictional force, as shown in FIG. 4, will give a signal in the detector. This type of detector is not sensitive to the twist of the cantilever because a twist does not give a change in the average height of the cantilever.

Also, a piezoresistive strain gauge or piezoelectric strain gauge built onto or into the cantilever will be sensitive to bowing, but not to twisting. One would need two gauges per cantilever to separate bowing from twisting. The same is true for a capacitive sensor. So, being able to measure friction while being sensitive to only one dimension of motion of the cantilever is necessary for some detectors.

In addition, to achieve a qualitative measurement of lateral force differences across a sample surface, the two-dimensional technique requires a great deal of calibration. Both the lateral and vertical stiffness of the cantilevers must be measured as well as the absolute gains of the lateral and vertical measurement channels. Thus, existing frictional force AFMs make relative lateral force measurements only, while quantitative measurements would be desirable.

Friction can be a relative measure or can be defined in terms of the coefficient of friction, which is the ratio of the frictional force to the normal force. For most practical situations, the frictional force is the dominant lateral force and it is acceptable to assume that friction is the only component of the force. But, the typical AFM tip is very sharp and the normal force is low so that the contact area and loading of the tip on the surface are both small. Thus, for AFMs, often the tip is strongly affected by lateral forces that are not proportional to the normal force, such as viscous forces. For users who are interested in true frictional characteristics, the capability not found in existing instruments to separate friction from other lateral forces would be useful. Moreover, the extremely fine lateral force-measuring capability makes it possible to map other forces whose normal force distribution varies across a sample surface, such as magnetic domains or electric fields in integrated circuits, because a change in normal force will cause a detectable change in the lateral force acting on the tip, but will not change the vertical deflection if the tip is in contact with the surface. To date, mapping magnetic or electrical forces has only been accomplished with AFMs that operate with the tip not contacting the surface. These AFMs measure the effect of the normal forces on the vertical motion of a vibrating tip.

Figures 7C, 7D, 18:
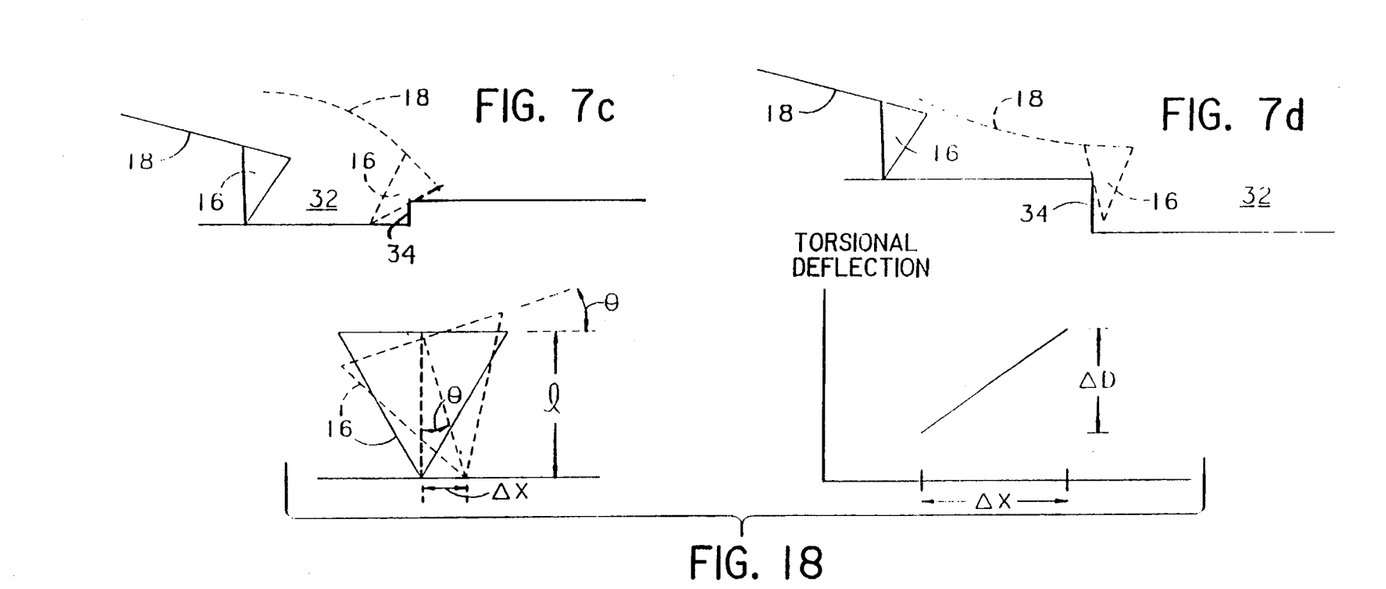
FIGS. 7c and 7d illustrate unusual bending forces possible due to topography.
FIG. 18 shows calibration of the deflection signal versus cantilever twist using the static mode.

Conventional one-dimensional detector AFMs actually do include a measurement of friction in a manner of speaking; but, this fact is not understood in the prior art. If the AFM is so arranged that the scan is along the long axis of a symmetrically-constructed scanner; then, the cantilever 18 will bend (convex or concave) toward the direction of scan as shown in the two examples of FIGS. 7a and 7b due to a frictional force $F_f$ on the tip 16. This bending will cause the light beam to move on the detector 24 just as bending due to changes in normal forces on the tip. This bending will vary with the stickiness of the surface; but, will also vary with topography. For instance, for scanning across a trench 32 with the above-described AFM arranged so that the scan is along the long axis of a symmetrically-constructed scanner, as shown in FIG. 7c, as the cantilever 18 climbs a wall 34 there will be significant bend due to a lateral force because the tip 16 will push into the wall 34 as it climbs. On the other side of the trench 32, the tip 16 will fall into the trench 32 with very little bending. This is the most extreme case, and is not actually friction related; but, shows how the tip 16 will bend due to the lateral forces, and how the direction of scan will affect the amount of bend. The key aspect of the bend is that it is similar to the bend due to topography for scans along the cantilever 18. Thus, in prior art AFMs, depending on scan direction, lateral force-induced deflections are interpreted as topography and not separately recognized for what they are. Nominally, one would expect that scanning along the cantilever axis should maximize the amount of lateral force-induced bend that is in the same direction as topography-induced bend and that scanning at 90 degrees to the axis should minimize the amount of lateral force-induced bend interpreted as topography because, at 90 degrees, the lateral force-induced bend is perpendicular to the topography-induced bend. Surprisingly, however, the inventor has discovered that in actual AFMs, asymmetries in the cantilever 18 and AFM construction can cause the angle at which the maximum lateral force-induced topography distortion occurs to be significantly different from that expected. Thus, friction is currently an uncontrolled distortion in conventional, prior art, one-dimensional AFMs.

SUMMARY OF THE INVENTION

Accordingly, one object of this invention to provide a new and improved method of operating an AFM having the capability solely to make vertical deflection measurements whereby relative lateral force, that is, the difference between forces measured in a forward scanning direction and in a reverse scanning direction, can be measured and imaged.

It is a further object of this invention to achieve the above-mentioned object with a novel method which makes use of existing AFM deflection detectors and which requires a minimum of calibration to yield a numerical value for the coefficient of friction.

It is another object of this invention to provide methods for obtaining calibrated frictional measurements from systems with two dimensional detectors.

It is a further object of this invention to provide a novel method to measure the static coefficient of friction using both one- and two-dimensional detector systems, and to use the static measurement to calibrate the detection systems.

It is still another object of this invention to provide a novel method of using a one-dimensional frictional measurement to calibrate a two-dimensional detector system.

It is yet another object of this invention to provide a novel method of obtaining frictional measurements using deflection detectors such as strain gauges, interferometers, etc., which are inherently one-dimensional detectors to measure friction and to correct topographic data for lateral frictional effects.

It is yet another object of this invention to provide a novel method of using the frictional force measurement capability to map normal force distributions of other forces such as magnetic or electrical forces.

It is yet another object of this invention to separate the frictional force from other lateral forces.

It is another object of this invention to use the methods of the invention to minimize the effect of lateral force-induced distortion on topography data.

These and other objects are achieved according to the present invention by providing a new and improved method of operating an AFM with a probe tip attached to the free end of a lever which is fixed at the other end, and having a means to detect deflection or bending of the lever, a scanning means to scan the probe tip relative to a sample, the detecting means being used to detect vertical deflection or bending of the probe tip as it is scanned over the sample due to the topography, or to detect the displacement of the lever due to lateral forces, where the method uses the same vertical deflection detector as used for topography, and the method can produce a numerical measure of the frictional properties of the sample surface.

According to the present invention the AFM's capabilities to measure and control bending of the lever in the vertical direction are maintained. Added to the AFM is a method to detect the bending of the lever due to the lateral forces exerted between the probe and sample, in particular the lateral force due to friction, during scanning. The lateral force is measured by observing the bending of the cantilever due to frictional forces as the sample is scanned. This is accomplished with the vertical deflection detector only and a computing means that uses data from scans of opposite direction over the same part of the sample surface as well as data derived from variation of the vertical deflection of the cantilever. The invention is preferably implemented in a fashion that allows for convenient use with existing AFM devices. The invention also includes methods of operating an AFM with lateral force measurement that produces novel results for both conventional one-dimensional detector AFMs and for two-dimensional detector AFMs. One method includes operating the AFM at different vertical feedback setpoints over the same topography. The normal force will vary for the different setpoints, which will change the frictional force only but not affect other lateral forces, so the frictional force may be determined separately from other lateral forces. These methods can yield a calibrated number for the coefficient of friction for a one-dimensional detector system because the lateral and vertical measurements are made with the same detector and electronics. Also this measurement may be made on a surface with known frictional characteristics, to yield a reference point to compare to other surfaces. This coefficient of friction can be imaged as a function of horizontal position in the scan. The calibration obtained with the one-dimensional method can be used to calibrate a two-dimensional detector system, since a one-dimensional measurement can be made with a two-dimensional system if the AFM controller has the ability to rotate the scan direction which is typically available in AFM controllers.

Another method that takes advantage of lateral force measurement is based on the behavior of the cantilever for very small x-y scan sizes, where the total x scan size is less than a few nanometers. The inventor has observed that for a small enough scan, the scanner moves but the tip remains fixed to the moving sample, such that the cantilever motion is all twist and no actual translation. The twist must reach a sufficient amplitude in order to overcome the static friction between the tip and the sample. It is possible to observe when the tip breaks free, and using the above methods for computing lateral force on the cantilever, to measure the static friction. For the case where the tip has not yet moved the amount of twist angle versus deflection signal can be calibrated since the twist angle can be computed from the length of the tip and the amount of scanner translation.

Another novel aspect of the invention applies the techniques of measuring lateral force to provide a unique capability to measure other forces, such as electrical or magnetic, with a contact mode AFM. The frictional force varies with the normal force so the amount of cantilever bending due to lateral forces will vary if the normal force changes. The above methods can measure lateral force-induced bending. Thus, in the case of an integrated circuit, for instance, the topography could be scanned in a normal fashion, and then rescanned with a voltage applied between the tip and the circuit. Regions where the oxidation/passivation layers were thinner, or more electrically active regions of the circuit, would exert a higher normal force on the tip, which would increase the bending due to friction. Similarly, for a magnetically susceptible tip, the tip would experience a higher normal force and thus higher lateral force when over magnetic domains. Thus, the lateral force measurement can be used to map other force distributions even for the case where the cantilever is in contact with the surface and the normal force variations do not affect the vertical deflection directly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the drawings, wherein like reference numerals designate identical or corresponding parts throughout the several views, the basic operation of the invention is illustrated schematically in FIGS. 7a and 7b. As the tip 16 is scanned in x, the lateral forces at the tip 16 tend to rotate the tip about contact point and thereby bend the cantilever 18 toward the direction of the scan—if the x scan is substantially along the length of the cantilever 18 for a cantilever 18 that is symmetrical along its long axis, such as uniformly-constructed rectangular and triangular cantilevers. The feedback, which moves the sample 12 vertically to keep the light beam 20 in the center of the split photodetector 24, will compensate for the frictional bending by moving the sample an amount $\Delta Z$ as shown in FIG. 7a and 7b. This effect is illustrated herein for a beam deflection detector; but, the shift may be observed in any type of AFM, such as an interferometer detector, depending on the geometry and the detector position. Such a detector is described in related U.S. Pat. No. 5,025,658. Note that the bending motion is in opposite directions for forward and reverse x scans such that, as depicted in FIGS. 7a and 7b, in one scan direction the topography will appear to be higher by $\Delta Z$ and in the other scan direction, lower by $\Delta Z$. In prior art AFMs, for surfaces that exert high frictional forces on the tip 16, this effect becomes detrimental to the data taking; so, the scan direction is often rotated 90 degrees, which puts the friction-induced shift in the lateral plane of the split photodetector 24, such that the shift is not interpreted as a height change. For the common triangular cantilevers, however, scanning at 90 degrees does not always yield good results as the cantilevers are not as stiff at 90 degrees. The AFMs that have been constructed with a two-dimensional detector to measure friction operate with the scan direction at 90 degrees to the cantilever's long axis to take advantage of the independence of the topography and frictional effects on the cantilever.

The present invention makes use of the shift in the vertical direction in a novel fashion. Rather than accept the inaccuracy of the shift effect or rotate the scan (which does not always yield good results), the invention uses the vertical shift to obtain a measure of the lateral forces. This invention can be implemented on existing AFMs, which makes it advantageous compared to other methods which require significant modifications. The elements of the microscope and deflection detector are not changed; and, the invention is implemented as part of the data reduction portion of the system, which is generally easier to modify. Many existing AFM control systems have sufficient computational resources which would allow the additional programming of the necessary functions required by the present invention.

One embodiment is to subtract data from forward and reverse scans to obtain a relative measure of the lateral force on the tip as a function of scan position.

Another embodiment uses data from two scans in the opposite direction over the same topography and also uses data from the force curve as described hereinafter. As shown in FIG. 6, a typical cantilever 18 is fixed at one end 36 and the other end carries the probe tip 16. The inventor herein has observed that for real cantilevers and AFMs, the response of the detector 24 may not be maximized as to differences between forward and reverse scans exactly along the cantilever axis. As mentioned earlier herein, in an ideal system, the difference between the forward and reverse scans as measured with a vertical detector would be maximized with the scan along the cantilever's long axis, as all of the lateral force-induced bending would be in the same plane as the topography-induced bending. Scanning at 90 degrees to the cantilever axis would put all of the lateral force-induced bending at 90 degrees to the topography-induced bending so the response of the detector to the lateral force would be very small. In actual fact and practice, however, due to physical and performance asymmetries of the cantilever 18, the maximum and minimum response may be at some potentially large angle to the cantilever axis, although the maximum and minimum response are usually still about 90 degrees apart. So, for the most general case, a user may have to scan at some angle to the cantilever 18 to get a measurable response induced by the lateral force, and in this case the cantilever geometry will not be well known. Therefore, the most general approach to implementing the present invention is to observe and display the lateral force distribution with the one-dimensional detector and then use the data from the particular instrument and cantilever 18 to establish the active parameters in use, such as the scan direction with respect to the cantilever axis; but, it may be difficult to obtain quantitative information with all cantilevers.

In many cases, a relative measure of lateral force obtained from the difference between the forward and backward scan may be sufficient for the user.

For the case where the cantilever 18 can be scanned with a known geometry, the present invention yields a quantitative result for the coefficient of friction. A preferred embodiment for this purpose will now be described, as shown in FIGS. 6 and 7a–7b. Assuming that the deflection is detected over the center of the tip 16, the normal force Fn acts about the fixed end 36 with a lever arm which is the length, "L", of the cantilever 18. The frictional force Ff acts on the tip 16 with a lever arm which is the length, "l", of tip 16. Both of these forces exert a torque on the cantilever 18 which cause the cantilever 18 to bend. These bending motions are both in the vertical direction for the case where the scan direction is substantially along the length of the cantilever 18; so, both motions will be mixed onto the vertical detector. The detector response is proportional to the angle of bend, which is proportional to the forces as follows:

$$S_f/S_n = \Theta_f/\Theta_n$$

where $S_f$ is the detector response to the frictional force, $S_n$ is the response to the normal force, $\Theta_f$ is the bend of the cantilever 18 due to the frictional force, and $\Theta_n$ is the bend of the cantilever 18 due to the normal force. The angles are proportional to the torques:

$$S_f/S_n = \Theta_f/\Theta_n = s(l \cdot F_f)/(F_n \cdot L)$$

where s is a constant that depends on the geometry of the cantilever 18. For a rectangular cantilever 18 of uniform thickness, for instance, s=2. Since the tip 16 is in contact with the sample 12, the deflection of the light beam 20' is proportional to the z motion of the sample:

$$i\ S_f/S_n = \Delta z_f/\Delta z_n = s \cdot (l \cdot F_f)/(F_n \cdot L)$$

Thus, the coefficient of friction may be determined:

$$C_f = F_f/F_n = \Delta z_f \cdot L/l \cdot s \cdot \Delta z_n$$

When the AFM is running in a feedback mode, the deflection of the light beam 20' is kept constant as the topography is tracked by the feedback adjusting the height of the sample 12 to maintain the deflection signal constant. So, any apparent shift in the topography due to the frictional force is actually the amount of sample height adjustment required to maintain constant deflection. This can be used to determine $\Delta z_f$ in the above equation. FIGS. 7a and 7b show how to use scans of opposite direction over the same topography to find $\Delta z_f$. The frictional force will bend the cantilever 18 in opposite directions for forward and reverse scans. The feedback loop, however, will adjust the sample 12 vertically to compensate for this bend. Thus, there is a shift in the topography data on an x scanline from forward to reverse scan, depicted in FIG. 8. This shift is due to the response of the deflection and feedback detector to the frictional force, and thus, is proportional to the frictional force, so $\Delta z_f$ is half the shift height of the same topography data point on a forward compared to a reverse scan. This is a measure of the lateral force and can be mapped as a function of X and Y, the position in the scan plane.

Figures 8, 10:
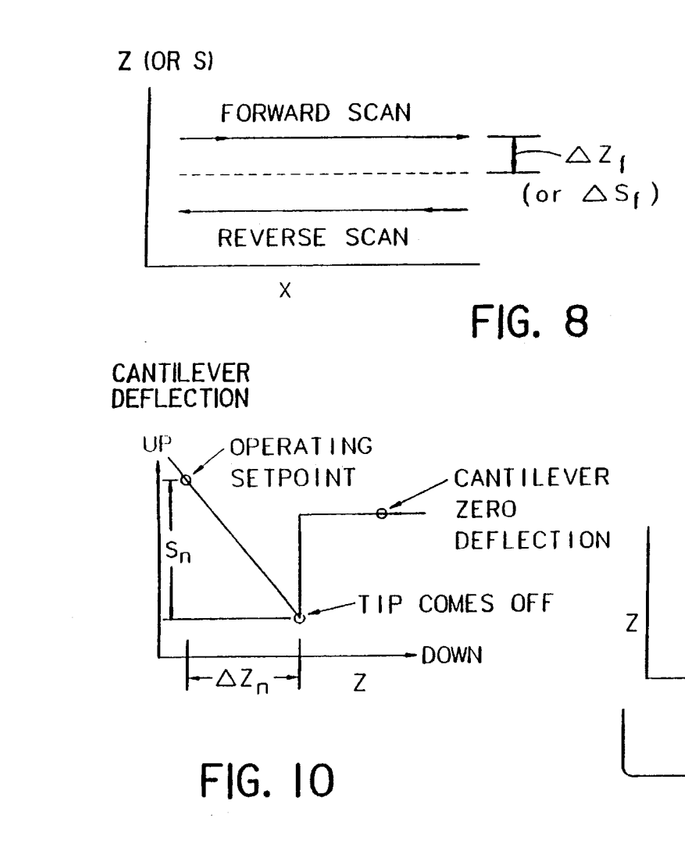
FIG. 8 shows how the data is affected by the frictional force on scans of opposite direction.
FIG. 10 illustrates the force curve and how the normal force may be derived from the curve.
Figure 9:
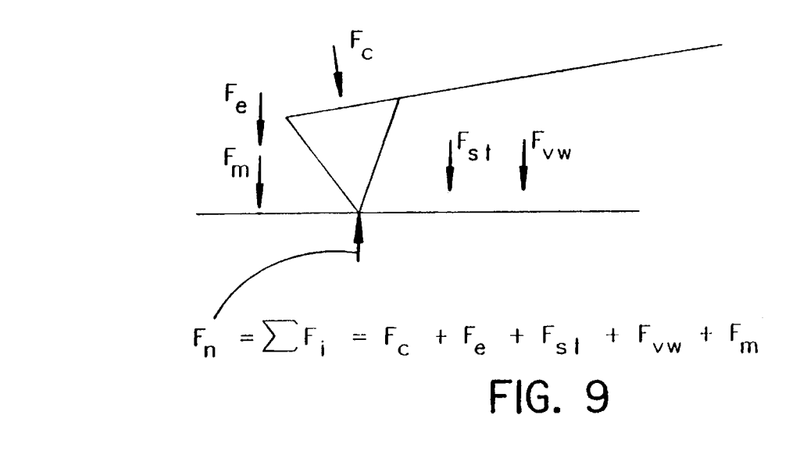
FIG. 9 shows the various forces interacting between cantilever and surface.

The normal force may be determined from the force curve. The force curve is generated by stopping the lateral scanning and modulating the sample 12 vertically over a range sufficient to encompass both the operating setpoint (deflection of the cantilever 18 which is maintained by feedback during scanning) and the point at which the tip 16 pulls off the sample. As shown in FIG. 9, the tip 16 is attracted to the surface of the sample 12 by a variety of forces which include the spring force (Fc) of the cantilever 18 (for positive cantilever deflection) and Van der Waals interatomic forces ($F_jw$). Depending on the sample 12 and the environment, the attractive forces may also include surface tension (Fst), which is usually the largest attractive force in ambient conditions. In some cases magnetic (Fm) and electric forces (Fe) may be present as well. The force curve is basically a plot of cantilever deflection (or force) versus sample height (z). As depicted in FIG. 10, z is varied from the position that establishes the feedback setpoint deflection past zero deflection, where the cantilever spring force becomes opposite in sign to the attractive forces, through to the point where the cantilever spring force is equal and opposite to the attractive forces. At this point, further increase in height causes the tip 16 to pull off the surface of the sample 12. So, the total change in z multiplied by the cantilever spring constant must equal the normal force at the operating setpoint. Thus, $\Delta z_n$ is the distance of the z axis of the force curve from the operating setpoint to the pull-off-point.

If the AFM is operated in a mode where the deflection signal is allowed to vary rather than in the feedback mode where deflection is maintained constant, the method works equally well. In the deflection mode, the backward/forward deflection difference $\Delta S_f$ due to friction may be measured instead of the height difference as shown in FIG. 8, and the normal deflection $\Delta s_n$ may be taken off the force curve as the equivalent difference on the deflection axis as shown in FIG. 10.

The $\Delta S_n$, $\Delta S_f$ values may be used instead of the $\Delta z$ values in the above equation.

As can be seen, there is no gain term left in the final equation; so, no calibration is required for this method as long as the detector response is linear. The term s may be calculated for the geometry of the cantilever 18. This method has application even for two-dimensional detector AFMs that have the capability to rotate scan angles. The expression for coefficient of friction for a two-dimensional detector system would be:

$$C_f = F_f/F_n = A \cdot (\Delta S_f / \Delta S_n)$$

where A is a constant that includes both the ratio of the two detector gains and the ratio of the torsional and deflection constants of the cantilever 18, $\Delta S_f$ is the lateral deflection signal measured with the lateral deflection detector, and $\Delta S_n$ is the vertical deflection signal measured from the force curve. This data would be acquired with the scan direction substantially perpendicular to the axis of the cantilever. If the same topography were first scanned along the cantilever axis, then the coefficient of friction could be calculated from the one-dimensional formula above. Thus, the constant A could be calculated by setting the two expressions for coefficient of friction equal, and the two-dimensional detector would be calibrated. This is a novel method to calibrate the two-dimensional AFM that does not require a surface with known lateral force (friction) characteristics.

We have heretofore described a method that produces a quantitative calibrated result for a highly localized coefficient of friction using existing AFMs with one-dimensional deflection detectors and for AFMs with two-dimensional detectors. The capabilities to generate a force curve, take data on forward and reverse scans, and perform differences are available on many AFM control stations; so, the invention is truly a method that can be implemented on existing devices. The method has the further advantage over more complex approaches that no previously known surface information is required and only one constant dependent on the cantilever geometry needs to be calculated. The method assumes the normal force is constant over the entire image and $\Delta z_f$ may be calculated on a point-by-point basis or as an average over multiple points or scanlines.

Although this embodiment offers several advantages, there are some issues to consider when applying the invention in this fashion. First, the normal force is derived at one point in the image; so, it is assumed that the normal force is constant over the entire scan because the deflection is kept constant during scanning. However, if there are regions of the scanned area that have fluid on them, such as lubricants on storage media, then the normal force component due to surface tension may change. Also, both the lateral and normal forces measured with this method include the effects due to surface tension, etc., and some of these are not truly friction because their lateral force-inducing component does not increase as the normal force is raised. So, this method actually measures total lateral force versus normal force, not just the part of the lateral force that is proportional to the normal force. Also, the actual scanner behavior may be an issue. Hysterisis and other non-linearities of the scanners can cause two effects which may be detrimental to the method. First, forward and backward scans may not line up exactly. This problem may be addressed by linearizing the scans as described in U.S. Pat. No. 5,051,646 by Elings et al, or using a closed loop control system. Alternatively, the user could display data from forward and backward scans and visually note which data point on the two scans correspond to the same place on the sample and mark these points with a cursor to line them up properly. The second non-linearity issue is bow of the image caused by the sample having a tilt, which because of hysterisis creates a bow in the scanline data. The bow will be in opposite directions on forward and backward scans and will therefore distort the frictional force data acquired with the above method. This problem can be addressed by ensuring the sample is as flat as possible, or by only measuring the friction near the ends of the scan lines where the effect of the bow is small.

A second embodiment of the present invention addresses several of the issues that can be a problem for the first embodiment. The second method does not use the force curve to find the normal force; but rather, takes data at two or more different operating setpoints, which means that the two data sets are acquired at two different normal forces. This method produces improved performance for both one- and two-dimensional AFMs. Since friction will increase as the normal force increases, the shift in the topography due to the friction-induced bending of the cantilever will increase as the normal force is increased. We will describe the second embodiment for a one-dimensional detector, but is can also be used for two-dimensional detectors.

Figure 11:
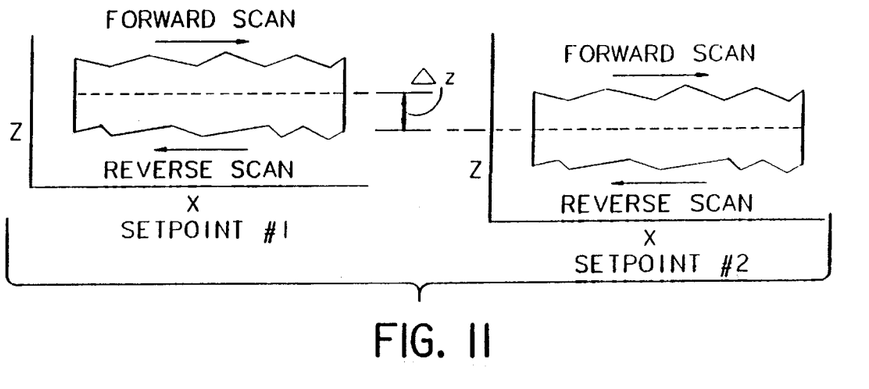
FIG. 11 illustrates the effect of changing the setpoint on the data from scans of opposite direction.
Figure 12:
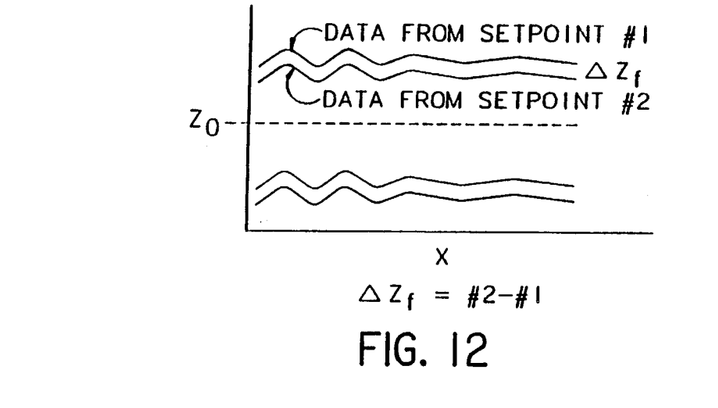
FIG. 12 shows normalized data from two sets of forward/reverse scans taken at different setpoints.

$\Delta z_n$ is simply the change in z position associated with changing the setpoint and $\Delta z_f$ is the apparent topography shift between the data at the two setpoints caused by the change in frictional force due to the change in normal force. A variety of methods for measuring $\Delta z_f$ and $\Delta z_n$ are possible: the inventor herein has found the following to give accurate results. As in the previous embodiment, data is taken on forward and backward scans over essentially the same topography at two or more different operating setpoints which means at two or more different normal forces. As shown in FIG. 11 for two different setpoints, the mean center line in z between each scanline pair is computed. $\Delta z_n$ is the difference between these two centerlines, which is the amount the feedback loop must move the sample 12 to go from one setpoint to the other. This difference could be found by just subtracting the means of the forward and reverse data at each setpoint. FIG. 12 illustrates what the data would look like with $\Delta z_n$ removed—i.e., the two means are set equal. $\Delta z_f$, on a point-by-point basis, is the difference between corresponding points on the data at each of the different setpoints. At the two setpoints, this is equivalent to taking half the difference between the differences of forward and backward data at each setpoint, i.e., a double subtraction.

$$\Delta z_f = 1/2 \{ (Z \text{ forward} - Z \text{ backward})_{setpoint\ I} - (Z \text{ forward} - Z \text{ backward})_{setpoint\ II} \}$$

This can be calculated for each point on the X scan and therefore each point on the X-Y scan.

Figure 13:
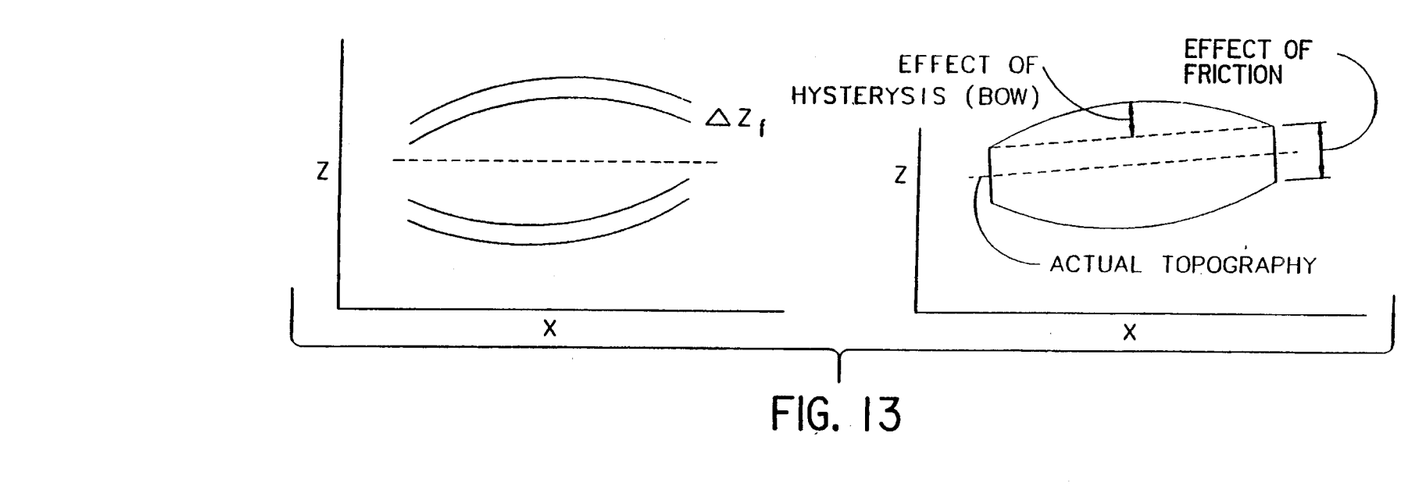
FIG. 13 illustrates how hysterisis and bow affect the data acquired at different setpoints in the same fashion.

As depicted in FIG. 13, this method is insensitive to bow because the bow will be the same for both data sets and will subtract out. It is not affected by hysterisis because the difference is taken from scanlines in the same direction. It yields true friction because it measures the difference in lateral force that occurs when the normal force is changed.

A relative coefficient of friction could be measured by taking data at two or more setpoints (in the feedback mode) and measuring the difference between the forward and backward data, $\Delta z_f$, at each setpoint. Since the setpoint or $\Delta z_n$ is a measure of the vertical deflections of the cantilevers, the change in setpoint or $\Delta z_n$ vs the change in $\Delta z_f$ will give a relative value for the coefficient of friction for a particular sample and this value could be compared to that for other samples.

Figure 20:
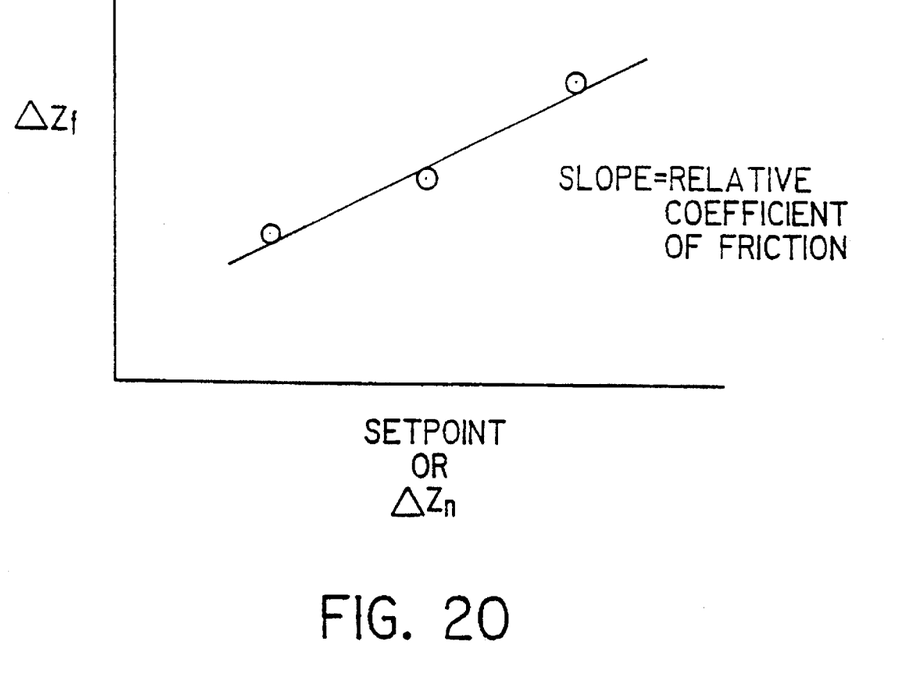
FIG. 20 is a graph illustrating changes in frictional force $\Delta Z_f$ as a function of changes in setpoint or normal force $\Delta Z_n$.

As shown in FIG. 20, this relative coefficient of friction would be the slope of the line, $\Delta z_f$ vs setpoint or $\Delta z_n$, since $\Delta z_f$ is a measure of friction and the setpoint or $\Delta z_n$ is a measure of the normal force.

The method of changing setpoints applies equally well to two-dimensional detectors. In this case the measure of normal force will come from one of the vertical deflection detector or $\Delta z_n$ when in the feedback mode. The feedback setpoint could be used, which is a measure of the cantilever vertical deflection. The measure of friction would come from the difference between forward and backward signals from the detector sensitive to the twisting of the cantilever. This method can also be used to separate normal force-dependent lateral forces from lateral forces that are not dependent on the normal force. Basically, the coefficient of friction measured with the multiple setpoint method will differ from measurements done at a single normal force if there is a significant amount of non-frictional lateral force. Thus, these methods can be used to characterize both types of lateral force. One method of calibration is to scan the probe tip back and forth across a surface of known frictional characteristics to establish a baseline reference. This baseline reference subsequently can be used for comparison with data acquired under the same scanning conditions by scanning back and forth across a sample having unknown frictional characteristics using interpolation and/or extrapolation to make a determination of the frictional characteristics of the surface of unknown frictional characteristics.

The inventor herein has found that a convenient implementation of the multiple setpoint method is to vary the setpoint on every other scanline for the case where an image is created out of a raster scan of a surface. Thus, one scanline cycle (forward and backward) can be done at a first setpoint and the next cycle done at a second setpoint with that pattern then being repeated for an entire image. The y scanning can be stopped during these procedures or can be left to continue scanning, so that the setpoints are changed on adjacent scanlines which, for a scan of several hundred lines, will not have a significant change in topography. The measurements can be made at any number of setpoints to improve data quality, or an entire image can be scanned at one setpoint and then rescanned at a second setpoint such that the measurement is made by subtracting the images, although this approach could be affected by scanner drift from image to image.

Figure 14:
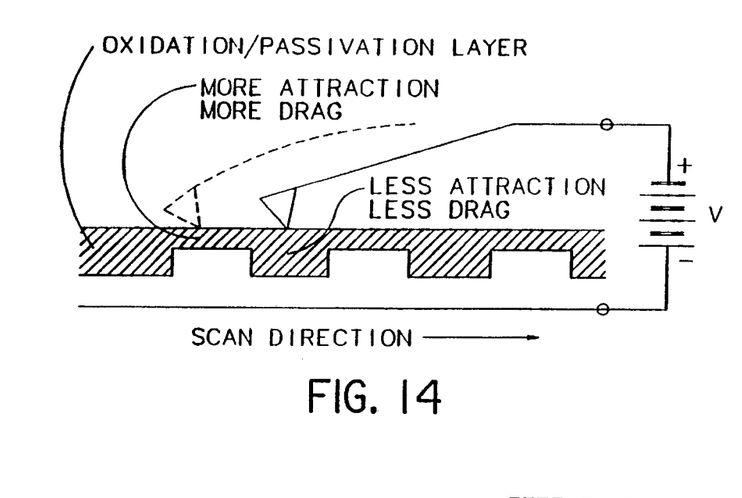
FIG. 14 illustrates how a contact AFM may be configured to measure electric field distribution.
Figure 15:
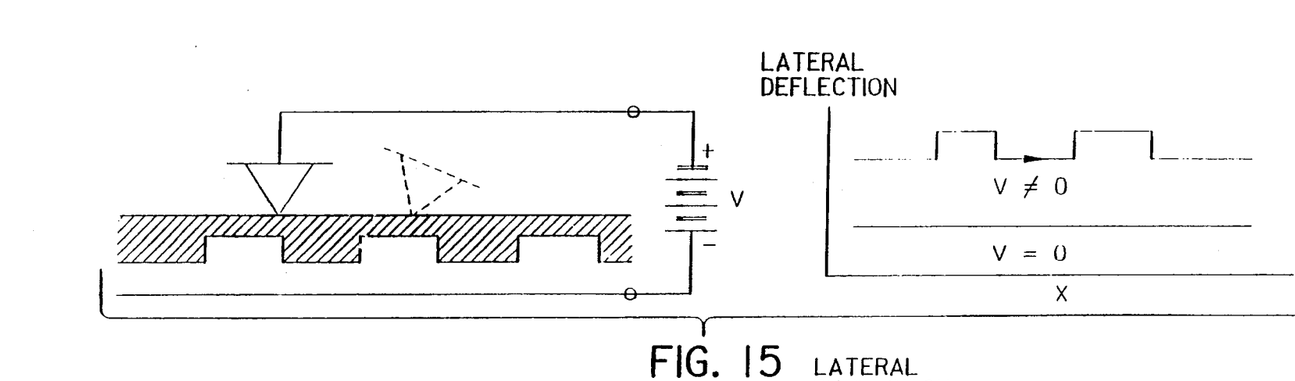
FIG. 15 shows how electric, magnetic, or other normal force distributions may be computed from lateral force variations.
Figures 16, 17:
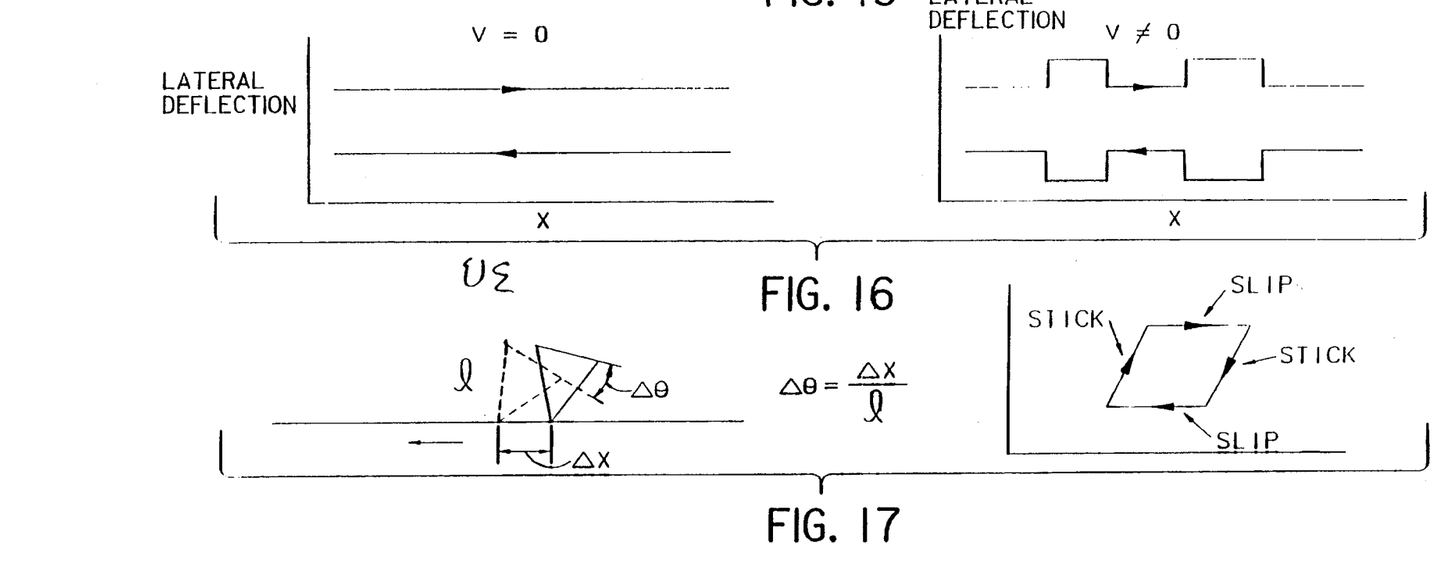
FIG. 16 shows a variation on the method for determining field-induced normal force variations.
FIG. 17 illustrates a static mode of operation where lateral force may be characterized.

This ability to measure lateral forces as a function of normal forces can be used to provide a unique capability for AFMs, whose tips 16 contact the surface of samples 12, to measure other types of forces not presently considered possible with this type of instrument. In a conventional contact mode AFM, normal force variations will cause either no variations or ambiguous variations in topography. So, forces like magnetic and electrical field-induced forces are not considered measurable with contact mode AFMs. Non-contact mode AFMs have been used to measure magnetic or electric fields for ultra-high resolution applications such as magnetic storage media and integrated circuits. These non-contact microscopes oscillate a tip above a surface and measure force interactions of the tip and the surface by observing the effect on the oscillation frequency or amplitude. Non-contact AFMs are much more complex and have lower resolution because the tip is relatively high above the surface. But, normal force variations do cause a variation in the lateral deflection of AFM cantilevers because the friction will increase if the normal force increases. Particularly for two-dimensional systems, these variations are completely distinguishable from topography; but, even single-dimensional systems can take advantage of this effect. This novel method can take two forms. The most general case is quite simple. If the surface characteristics are known, then in the presence of an applied field and a field sensitive probe, any variation in extraneous force profile compared to the known surface characteristic is due to the normal force induced by the field. So, a map of variation versus expected lateral force distribution is a map of the fields. This is useful for magnetic fields that cannot be easily turned on and off such as storage media, but where the surface characteristics are known, such as a flat uniform hard disk. Alternatively, as depicted in FIG. 14, illustrated for a single-dimensional detector, the surface may be scanned without the field on, and then rescanned with the field applied such as would be convenient for an integrated circuit where a voltage between the probe and the circuit substrate could be easily turned on and off. As depicted in FIGS. 15 and 16, this method may be used with both the one-and two-dimensional AFMs, and either forward/backward differences may be taken both in the presence and absence of applied fields and compared, or just a single difference over the same topography with the field on and off could be used. A variety of different schemes to compare the novel technique of lateral force variation due to field-induced normal force variation will occur to those skilled in the art—and fall within the scope and spirit of this invention.

Yet another novel method to use lateral force in an AFM depends on a phenomenon observed by the inventor herein at very small scan sizes. For a very small scanner translation along the axis of the cantilever 18, such as one nanometer, movement of the scanner causes the cantilever 18 to bend; but, the tip 16 stays fixed on the surface of the sample 12. The tip 16 will not begin to move until the torsional force of the cantilever 18 bending overcomes the static friction of the tip 16 on the surface of the sample 12. This is illustrated in FIG. 17, and applies equally well to any scan direction; so, the phenomenon can be seen for both one- and two-dimensional techniques, although the cantilever stiffness may vary significantly with scan direction. Because the scan translation is a known quantity and the tip length, l, is known, this static motion can be used to calibrate the detector response versus the cantilever and detector characteristics, as shown in FIG. 18. This is another novel method of calibrating the amount of force-induced cantilever bend or twist versus deflection signal. For the case where the geometry of the cantilever 18 is known, the amount of translation to the point where the cantilever 18 begins to slip times the torsional constant divided by the normal force yields the static coefficient of friction. In other words:

$$\text{Sin}\Theta = \Delta X / l$$

when $\Delta X << l$, then $\Theta = \Delta X/l$ $$T_c\Theta = \Delta D \text{ or } T_c = \frac{l\Delta D}{\Delta X}$$

where $\Delta D$ is the detector response and $T_c$ is the calibration constant of the cantilever 18. Thus the static technique also can be used to calibrate for the case where the scan needs to be done at an angle to the cantilever 18 to achieve adequate response as described above for non-symmetrical cantilevers. The static method could be used to measure local friction on a sample which cannot be scanned such as a very soft sample or a sample with very rugged topography where the topographical variation exceeds the vertical range of the scanner over a short distance.

Figure 19:
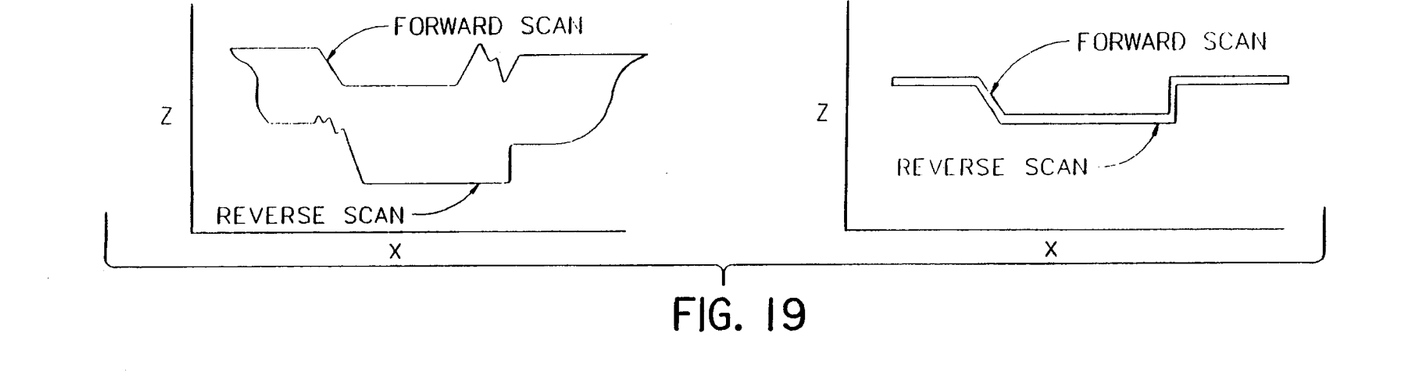
FIG. 19 illustrates maximum and minimum lateral force effects on topography.

The methods of this invention may also be applied in a manner directed at reducing the amount of lateral force-induced cantilever bend on the normal force-induced measurements. As is clear from the foregoing discussion, lateral force-induced bending often distorts topography. The methods described heretofore include techniques to separate the lateral component for the purposes of measuring lateral force. However, for the common case, where the topography data is of interest, these methods may be used to minimize the lateral component that is measured so as to reduce the distortion of the topography. The lateral bend will occur regardless of scan direction or detector geometry; but, the scanning may be arranged so as to make the lateral bend out of the plane of the normal bend, such that the lateral component is not detected along with the normal component. This could be accomplished in theory by knowing the geometry; i.e., for a symmetrical cantilever 18, the maximum distortion the lateral component has on the normal component should occur when the scan direction is along the cantilever axis and the minimum effect should occur with the scan at 90 degrees to the cantilever axis. In practice and as mentioned previously, however, asymmetries can affect the actual scan directions at which the effects are minimized by 60 degrees or more, in an unpredictable fashion. The methods of this invention, however, may be applied to accurately determine the optimum direction in which to scan to either minimize or maximize the detected lateral component. As depicted in FIG. 19, the data from forward and reverse scans may be displayed for a scanline. The scan direction may then be rotated while observing the forward/reverse scan data. When the vertical separation between the two lines is maximized (as in the lefthand portion of FIG. 19), the lateral component is being detected the strongest and when the vertical separation between the two lines is minimized (as in the righthand portion of FIG. 19), the lateral component is being detected at its weakest. Additionally, topographic features such as sidewalls will be maximally distorted and surface frictional differences will show as topography of opposite sign on the two traces when the lateral component is detected in the vertical direction. If the scan direction is rotated until the two lines have the minimum separation as shown in the figure, this becomes the direction one should scan to achieve the least distortion on topography data. Of course, one could subtract the lateral data from the topography using the lateral data measured with the previously described methods; but, if topography is the desired measurement, it is more convenient to simply scan at an angle that minimizes lateral distortion. Obviously, the method could be implemented by simply displaying one scan direction and finding the angle at which the scan appeared the least noisy or distorted; but, forward/backward scans more clearly separate lateral from normal components. Variations of this method such as multiple averaged scanlines or other patterns that show lateral/normal separation will occur to those skilled in the art—and fall within the scope and spirit of this invention.

The methods have been described in the context of a light beam deflection system, but are also applicable to one dimensional detectors such as interferometers, strain gauges and capacitive sensors.

Thus, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a method of operating an atomic force microscope having a probe tip attached to a free end of a lever which is fixed at the other end, a sample on which the probe tip is placed, scanning means for producing lateral motion of the tip or sample, and detection means for detecting the bending of the lever, the improvement comprising:

a) producing lateral motion of the tip or sample such that during part of the motion, the tip and sample move together because of lateral force between the tip and sample;

b) measuring by means of the detection means deflection of the lever during the part of the motion in step a); and c) determining a calibration of the detection means from the known motion in step a) and the deflection measured in step b).

2. The method according to claim 1, where the lateral motion produced in step a) is produced at an angle to a longitudinal axis of the lever and the deflection of the lever measured in step b) is a torsional deflection.

3. The method according to claim 1, wherein the detection means comprises a light source and a split photodetector which is sensitive to torsional deflection of the lever, and step b) comprises reflecting light from said light source off said lever to said split photodetector.

4. A method according to claim 1, wherein the probe tip has a known length and step c) comprises determining an angle of deflection of the lever from the lateral motion produced in step a) and the known probe tip length.

5. A method according to claim 4, where the spring constant of the arm is used to calibrate the detection means in terms of the lateral force on the tip of the probe.

* * * * *